July 31, 1934.  P. W. DIETER  1,968,516
BOLT
Filed July 22, 1930
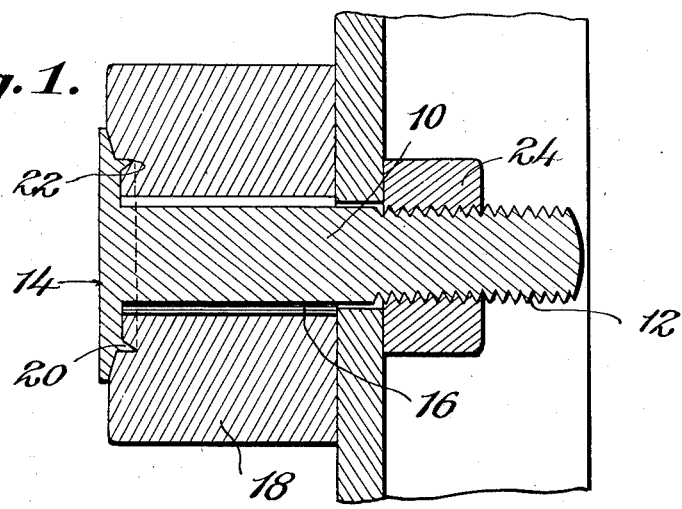
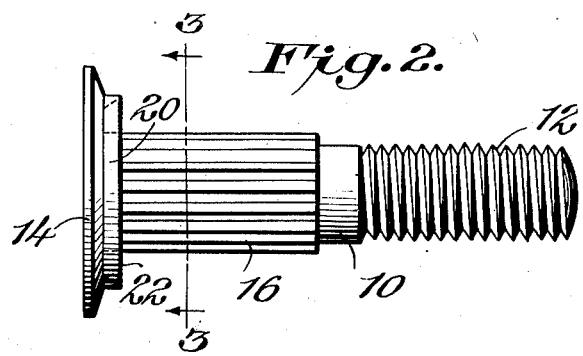
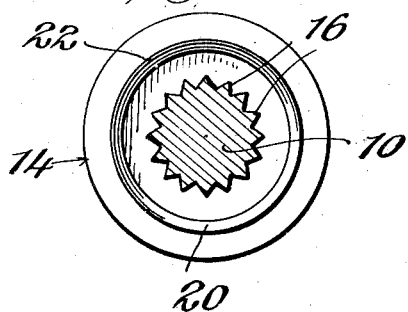
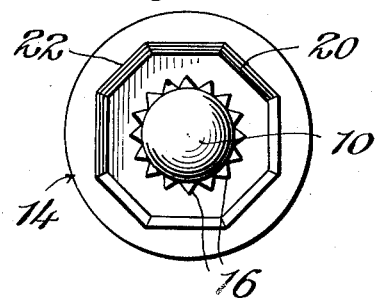
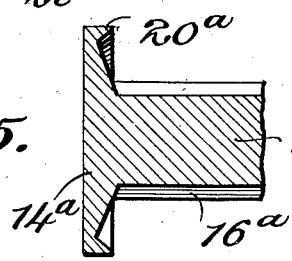
Inventor
Paul W. Dieter,
By O. P. Wolhaupter
Attorney Patented July 31, 1934

1,968,516

UNITED STATES PATENT OFFICE 1,968,516

BOLT

Paul W. Dieter, New York, N. Y., assignor, by mesne assignments, to P. W. Dieter, Inc., New York, N. Y.

Application July 22, 1930, Serial No. 469,783

2 Claims. (Cl. 85—9)

This invention relates to bolts, and has in view to provide a bolt embodying a construction designed to prevent leakage of water or other liquid beneath the head of the bolt into the hole in the member through which the shank of the bolt extends.

In many instances bolts are employed to extend through members of wood or other relatively soft material, either to secure such members to other members or to secure other members to said first mentioned members, and in practically all such instances it is desirable to prevent leakage of water or other liquid beneath the head of the bolt into the hole in the member through which the shank of the bolt extends, not only in some cases to prevent loss of the liquid, but in practically every instance to avoid the deteriorating effect of the liquid on the wood or other material of the member through which the bolt extends.

It has been found that even though the shank of a bolt very closely fits the hole in a member through which the bolt extends, liquid will seep beneath the head of any ordinary bolt into the bolt hole in the member, with eventual deterioration of both the bolt and the member, and this is particularly true if the bolt is provided as is usual with a laterally protruding shank formation for formations to bite into the member to prevent rotation of the bolt, since the material of the member is thereby ruptured and the water or other liquid is thereby enabled the more readily to enter the pores of the member.

Accordingly, the primary object of the present invention is to provide a bolt embodying a construction to prevent leakage or seepage of water or other liquid beneath the head of the bolt into the hole in the member through which the shank of the bolt extends.

Another object of the invention is to provide a bolt embodying a construction to serve the purpose stated which bolt is cheap and easy to produce and thoroughly reliable and efficient in use.

With the foregoing and other objects in view, the invention consists in the features of novelty as will be hereinafter more fully described, illustrated in the accompanying drawing and defined in the appended claims.

In the drawing, wherein like characters of reference denote corresponding parts in the different views:—

Figure 1 is a longitudinal sectional view through a bolt constructed in accordance with the present invention and illustrating the same in use.

Figure 2 is a side elevation of the bolt;

Figure 3 is a transverse section on the line 3—3 of Figure 2;

Figure 4 is a view similar to Figure 3 illustrating a slight modification of the invention, and Figure 5 is a fragmentary sectional view of a bolt illustrating a modification of the invention.

Referring to the drawing in detail, it will be observed that the present bolt includes, as usual, a shank 10 threaded at one end, as at 12, and provided at its other end with a head 14 having a flat outer face 14a and a flat under surface 14b inclined toward the periphery of the head, which head may be of any desired size and shape.

The shank 10, adjacent to the head 14, preferably but not necessarily, is provided with a suitable laterally projecting formation or formations 16 to bite into the material of the member 18 through which the bolt extends to hold the bolt against rotation relative to said member, such formations in the present instance being comprised by an annular series of teeth or ribs of any suitable length formed in and extending longitudinally of the shank 10.

In accordance with the present invention, the inner face of the head 14 of the bolt has formed thereon an annular flange 20 of larger diameter than the shank 10 to bite into the material of the member 18 and to cooperate with said member to provide a seal to prevent water or other liquid from leaking beneath the head 14 into the bolt hole in said member. This flange 20, which may be of circular shape as shown in Figure 3, of octagonal shape as shown in Figure 4, or of hexagonal or any other suitable or desired shape, preferably is tapered in cross section to a relatively thin knife-like free edge 22 to facilitate sinking of said flange into the material of the member 18 when the usual nut 24 which is threaded on the shank 10 is tightened. Preferably also, but not necessarily, that portion of the inner face of the bead 14 which is disposed outwardly of the flange 20, is flared outwardly so as to effect maximum compression of the material of the member 18 adjacent to said flange, and to seat firmly against the face of the member 18 at the periphery of the head.

As is manifest, when the nut 24 is tightened, the head of the bolt is forced towards member 18 and the flange 20 thereby is caused to sink into the outer face of said member. Thus, an effective seal is produced against the leakage of water or other liquid beneath the bolt head into the bolt hole in the member 18, and if the nut 24 is tightened sufficiently to draw the flared marginal portion of the inner face of the head 14 into engagement with the member 18, this seal is considerably enhanced due to the compression of the material of the member 18 adjacent to the flange and to seating of said flared marginal portion against the face of the member 18 as is obvious.

According to the embodiment of the invention illustrated in Figs. 1 to 4 of the drawing, the flange 20 is located on the outwardly flaring inner face of the head 14 of the bolt outwardly of the shank of the bolt and inwardly of the periphery of the bolt head. As a modification of this structure, attention is directed to Fig. 5 of the drawing, wherein the flange 20$^a$ is located at the periphery of the bolt head 14$^a$, the inner face of the head preferably being flared outward from the shank 10$^a$ of the bolt to the base of said flange 20$^a$. According to both structures the flaring of the inner face of the bolt head avoids the necessity of countersinking the member 18 against which the bolt head is drawn, as the flare of the head adapts the latter to sink readily into the member. However, according to the structure of Figs. 1 to 4, the bolt head does not become seated until after the flange 20 has sunk into the member 18, whereas, according to the structure of Fig. 5, seating of the bolt head occurs simultaneously with the sinking of said flange into the member 18. Moreover, according to both embodiments of the present invention, the formations 16 are in the form of ribs or flutes, as distinguished from a square or equivalent formation as in the case of the well known carriage bolt, to the end that only minor resistance is offered to drawing the present bolt to sink the head thereof into the member 18, and to the end that the material of the member 18 may not be seriously broken or distorted by said rotation preventing formations.

From the foregoing it will be observed that the present invention provides a leak-proof bolt of the type having screw threads to receive a nut, the said bolt having a flat top head 14 whose underside is provided with an outwardly tapered seating face 14$^b$. It is also pointed out that the longitudinally disposed ribs 16 are formed on the shank directly from the underside of the head 14. In that way the ribs 16 completely seal the opening in the wood member which receives the shank of the bolt. In other words, no space occurs between the underside of the flat top head and the longitudinal ribs 16 which would result in the provision of a pocket that would receive water leakage and tend to rot out the wood surrounding the shank of the bolt. These distinctive features, namely the longitudinal ribs extending directly from the underside of the head and the tapered seating face 14$^b$ on the underside of the head are important since they not only fully protect the wood from the reception of water but also it is unnecessary to countersink the wood in the zone of the head as is necessary with the button head type of bolt. As shown in Figure 1, the flat top head of the bolt may be drawn up substantially flush with the outer face of the wood member 18. It is, of course, understood that the portion of the shank having the longitudinal ribs 16 thereon is of larger diameter than the plain portion 10 of the shank or threaded portion 12, thereby effectually locking the bolt in the wood member against rotation.

Without further description it is thought that the features and advantages of the invention will be readily apparent to those skilled in the art, and it will of course be understood that changes in the form, proportion and minor details of construction may be resorted to, without departing from the spirit of the invention and the scope of the appended claims.

I claim:—

1. A leak-proof bolt comprising a shank, a head, and an annular flange on the inner face of the head to sink into the member through which the bolt extends to provide a seal to prevent leakage of liquid beneath the head into the bolt hole in the member, the inner face of the head being inclined outwardly from the shank to the base of the flange, and the penetrating edge of the flange being disposed in approximately the same plane transversely of the bolt as the junction of the outwardly inclined inner face of the head with the shank, whereby the flange begins to penetrate the member through which the bolt extends substantially simultaneously with beginning of sinking of the inner face of the head into the member when the bolt is tightened.

2. A bolt having a shank and a laterally enlarged head adapted to be drawn tightly into a wood body with the outer surface of the head substantially flush with the surface of said body, the under side of said head composed of a depending annular wood-depressing marginal rib, and a radially-wise wood-receiving inverted-V groove surrounded by said rib and formed by a pair of upwardly converging frusto-conical faces extending upwardly from the bottom edge of said rib and substantially from said shank, respectively.

PAUL W. DIETER.